(No Model.)
F. W. DAVENPORT.
ORNAMENTING TOOL.
No. 282,613. Patented Aug. 7, 1883.
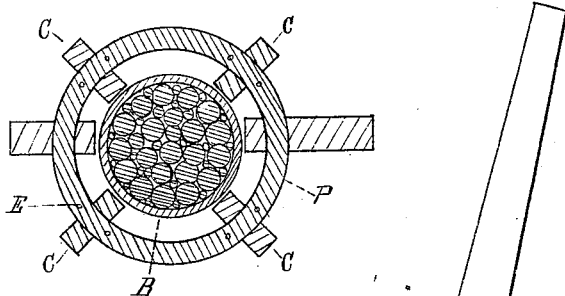
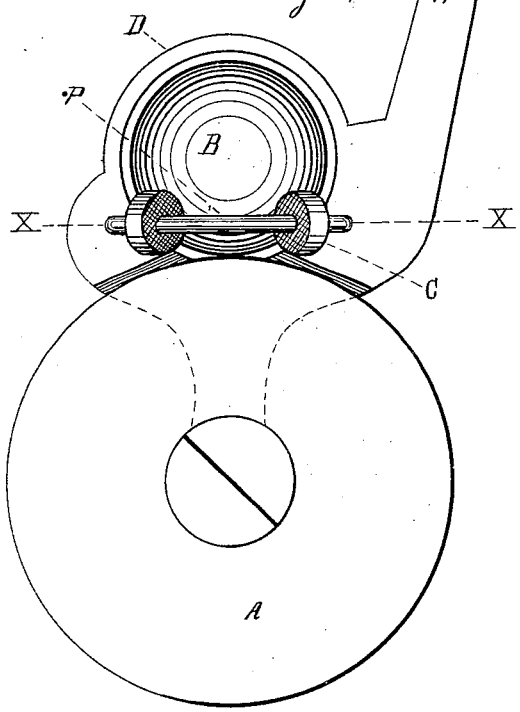
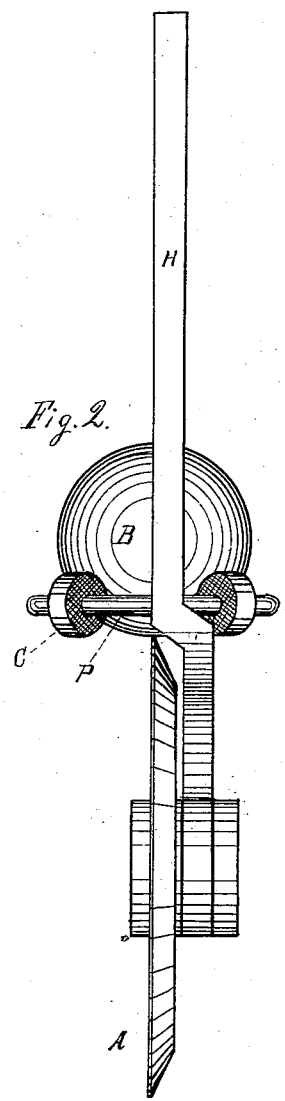
Witnesses
L. B. Davenport
J. A. Potter
Inventor
Frank Winthrop Davenport

UNITED STATES PATENT OFFICE.

FRANK W. DAVENPORT, OF PROVIDENCE, RHODE ISLAND.

ORNAMENTING-TOOL.

SPECIFICATION forming part of Letters Patent No. 282,613, dated August 7, 1883.

Application filed October 23, 1882. (No model.)

*To all whom it may concern:*

Be it known that I, FRANK WINTHROP DAVENPORT, a citizen of the United States, residing at Providence, in the county of Providence and State of Rhode Island, have invented certain new and useful Improvements in Ornamenting-Tools, of which the following is a specification.

My invention relates to that class of tools used in applying gilt or other ornamental lines to morocco boxes, books, and other articles.

The object of this invention is to facilitate that process, which I accomplish in the manner described in the following specification, reference being had to the accompanying drawings, in which—

Figure 1 is a side view. Fig. 2 is an edge view, and Fig. 3 is a section taken through the line $x\ x$ of Fig. 1.

The principle upon which this tool operates is to first imprint the design in size, after which gold-leaf or bronze or other powder is applied for the purpose of bringing out and enhancing the effect of the same.

The essential parts of the tool are the ornamenting-roll A and the charging-ball B, which is supported in contact with the edge of said roll. The roll A is made from metal or other suitable material, and has the required design formed upon its circumferential edge. The charging-ball B may consist of a solid rubber ball; but it is preferable to use a hollow rubber ball, the interior being filled or partly filled with lead, or its equivalent, ordinary shot being admirably adapted to this purpose. This interior filling tends by its weight to keep the ball in close contact with the edge of roll A. The object in only partly filling the interior is to allow the ball to be slightly compressed, so as to be taken out of its position for applying the size and for cleaning. The ball B is maintained in contact with the edge of roll A by the small rollers C, which are so placed as to allow nearly the whole weight of the ball to rest on the edge of roll A. Of course as the ball tips from side to side one or more of the rollers must carry part of its weight. The curved piece D prevents the ball rising from its seat, and may be of any form, provided it is so placed as to keep the ball upon the rollers. The loose rollers C are mounted upon the ring P at four equidistant points, and the pins E (see Fig. 3) are preferably set far enough apart to allow a slight lateral movement of said rollers. This aids in giving an irregular movement to the charging-ball B, thus presenting a new surface in contact with roll A. The rollers also help to distribute the size upon the surface of the ball. The shank of the tool H is designed to fit into a suitable handle.

The operation of the tool is as follows: Take out the ball B, its elasticity allowing it to be compressed so as to pass between the rollers C and the curved piece D. Place a little size upon it and roll it well between two pieces of slate or smooth board, so as to coat it evenly with the size. Then place it in position, and the tool can be used by passing the roll A over the surface to be ornamented, and then applying gold-leaf, bronze-powder, or other substance for the purpose of bringing out and enhancing the effect of such formed design. The charging-ball B keeps the roll A coated with the sizing as it revolves. It is obvious colored ink may be used in place of the size when other than gilt ornamenting is required.

Having fully described my invention, what I claim as new, and desire to secure by Letters Patent, is—

1. The combination of the ornamenting-roll A, the charging-ball B, and means, substantially as described, for holding said ball in contact with the edge of said roll.

2. The combination of the ornamenting-roll A, the charging-ball B, the rollers C, the ring P, the piece D, and the shank H, all arranged and operating substantially as and for the purpose set forth.

FRANK WINTHROP DAVENPORT.

Witnesses:
JAMES A. POTTER,
L. B. DAVENPORT.